Patented June 8, 1954

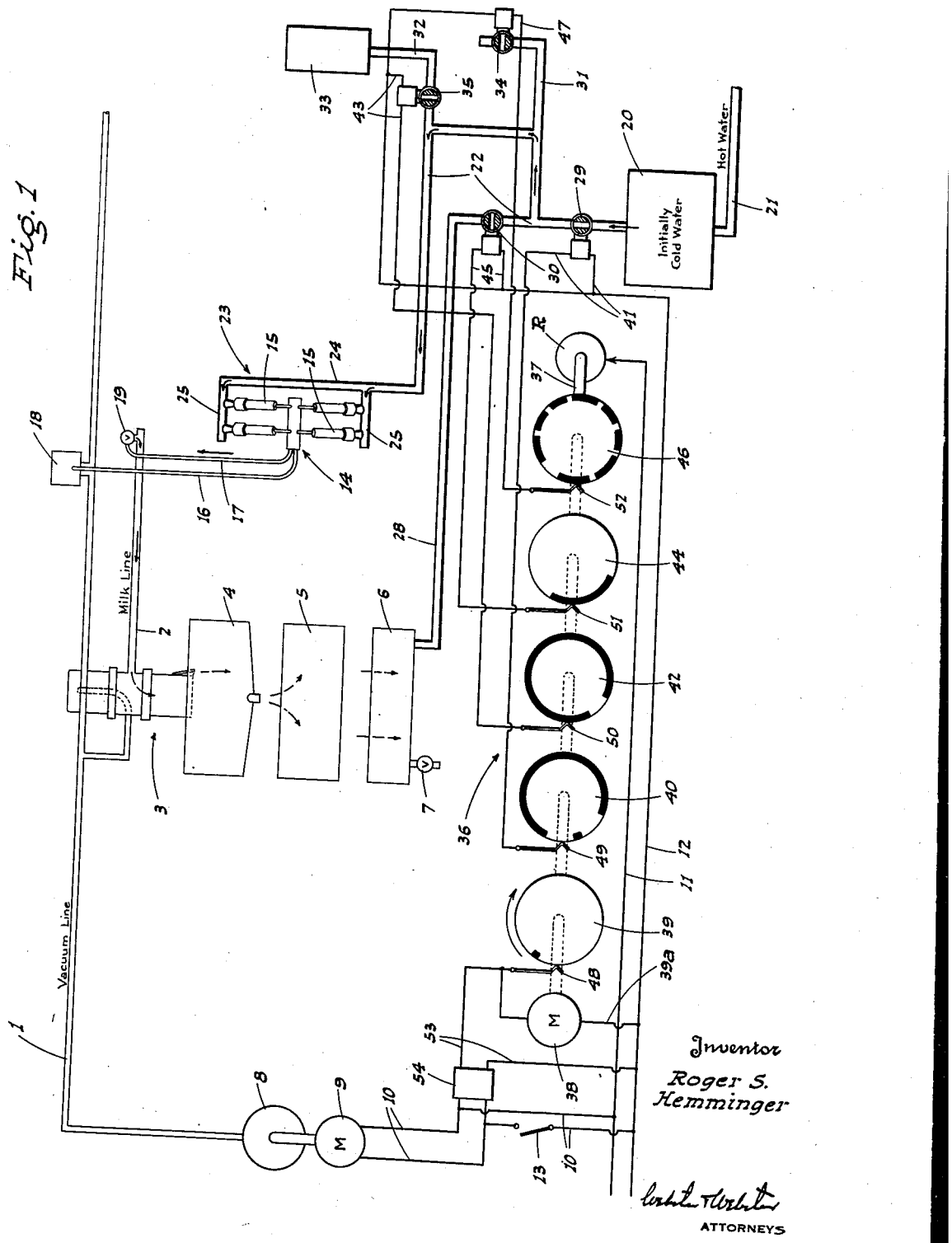

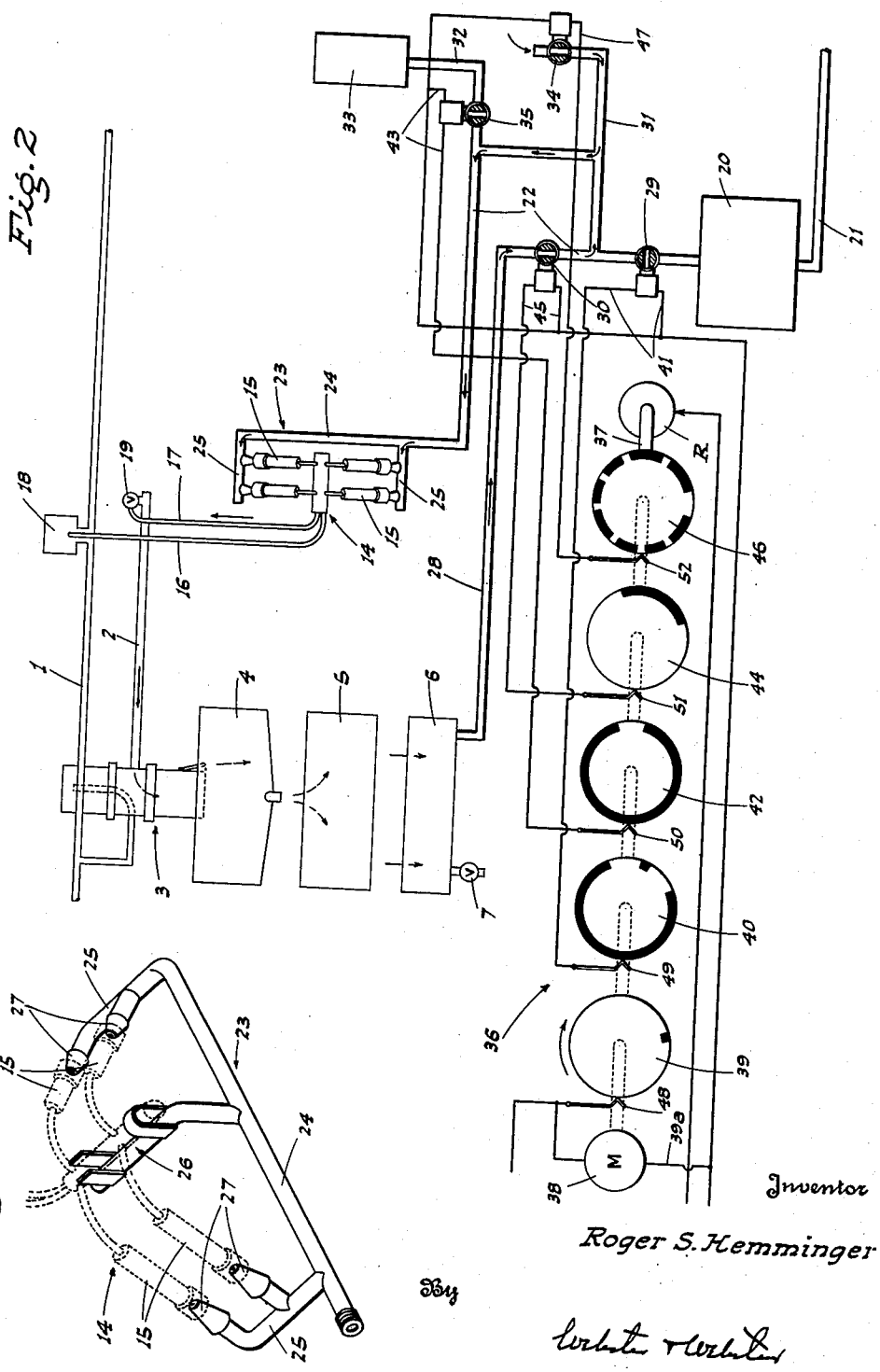

2,680,445

UNITED STATES PATENT OFFICE 2,680,445

FLUSHING APPARATUS FOR MILKING SYSTEMS

Roger S. Hemminger, Modesto, Calif., assignor to Berry Milking System, Modesto, Calif., a partnership Application July 3, 1950, Serial No. 171,900

5 Claims. (Cl. 134—58)

This invention is directed to, and it is an object to provide, a novel apparatus for flushing, after use, a continuous flow-type milking system wherein milk flows under vacuum from the claw units through a milk line to a receiving and discharging unit at a central station in the dairy; such a system being illustrated in Patent No. 2,583,723, dated January 29, 1952, to George W. Berry.

Another object of the invention is to provide flushing apparatus, for a milking system, which is arranged—once placed in operation—to run automatically through a predetermined cycle which includes initial flushing with cold water, subsequent flushing with hot water and soap, and final circulation of the water through the system; there being recurrent admission of air into the system, at predetermined times, in order to boost or enhance the flushing action.

A further object of the invention is to provide flushing apparatus, as above, wherein said automatic cycle is controlled by a novel switching unit and solenoid valves responsive thereto.

An additional object of the invention is to provide flushing apparatus, for the purpose described, which employs a novel supporting or mounting device for each claw unit, of the milking system, during the flushing cycle.

It is also an object of the invention to provide flushing apparatus which is designed for ease and economy of manufacture, and convenience of operation and maintenance.

Still another object of the invention is to provide a practical and reliable flushing apparatus for milking systems, and one which will be exceedingly effective for the purpose for which it is designed.

These objects are accomplished by means of such structure and relative arrangement of parts as will fully appear by a perusal of the following specification and claims.

In the drawings:

Fig. 1 is a diagrammatic view of the flushing apparatus as in use in connection with a milking system; the apparatus being shown in the initial or cold-water entry stage of the cycle.

Fig. 2 is a similar view, but shows the apparatus in the circulating stage of the cycle.

Fig. 3 is an enlarged perspective elevational view of the supporting or mounting device used for each claw unit.

Referring now more particularly to the characters of reference on the drawings, the flushing apparatus is adapted for use in connection with a continuous flow-type milking system which includes a vacuum line 1 and a milk line 2 which extend from adjacent the milking stations, as in a barn, to a central station in the dairy; the vacuum line 1 and milk line 2 there being connected to a vacuum-actuated milk receiving and discharging or releaser unit, indicated generally at 3.

The vacuum-actuated milk receiving and discharging unit 3 includes a plurality of vertically staged tanks 4, 5, and 6; the uppermost tank 4 being a receiver; the intermediate tank 5 including an aerator; and the lowermost tank 6 being the final receiver, and being fitted with a drain or outlet valve 7.

Vacuum is applied to the line 1 from a vacuum pump 8 driven by a motor 9 energized through the medium of a switch-controlled circuit 10 which leads from the main current supply circuit, whose leads are indicated at 11 and 12.

The circuit 10 includes a switch 13 for control of the motor 9 when the milking system is in use, but this switch is open when the hereinafter described flushing apparatus is in operation.

Each milking station includes a claw unit, indicated generally at 14, having teat cups 15 and being connected to a vacuum hose 16 and a milk hose 17 which lead to the vacuum line 1 and milk line 2, respectively.

A pulsator 18 is connecter between the vacuum hose 16 and the vacuum line 1, while a manual valve 19 is connected between the milk hose 17 and the milk line 2.

After use of a milking system of the type above outlined, it is requisite that such system be fully and effectively washed out or flushed, and it is the purpose of the present invention to accomplish this end by novel apparatus, as follows:

The numeral 20 indicates a relatively small tank which initially carries a quantity of cold water, but which tank is connected by a pipe 21 with a supply of hot water, so that after the cold water is initially drawn from the tank 20, hot water follows thereinto and is immediately available.

A main flow pipe 22 leads from the tank 1 and connects, at its other end, with a claw unit supporting device, indicated generally at 23.

Such claw unit supporting device comprises a pipe 24 which couples to the main flow pipe 22; there being laterals 25 projecting horizontally in the same direction from the pipe 24 on opposite sides of an upstanding clamp 26 which supports the body of the claw unit 14. The laterals 25 each carry upstanding nozzles 27 on which the teat cups 15 removably engage.

It is understood that the milking system includes a number of the claw units 14, and consequently there will be a corresponding number of the claw unit supporting devices 23 all connected in communication with the main flow pipe 22.

A return pipe 28 leads from the bottom of the lowermost tank 6 to connection into the main flow pipe 22 adjacent but short of the tank 20.

A water entry, solenoid valve 29 is interposed in the main flow pipe 22 between the tank 20 and the point of connection of the return pipe 28; there being a circulation control, solenoid valve 30 in said return pipe 28.

Between the water entry valve 29 and the claw unit supporting device 23, but beyond the point of connection of the return pipe 28, the main flow pipe 22 is in communication with an air entry pipe 31 and a soap entry pipe 32. The latter pipe connects to a liquid soap tank 33.

An air entry, solenoid valve 34 is interposed in the pipe 31, and a soap entry, solenoid valve 35 is interposed in the pipe 32.

The solenoid valves 29, 30, 34, and 35 are controlled, in predetermined timed or cycled relation, by a switch unit, indicated generally at 36.

The switching unit 36 is of rotary switch type and includes a plurality of rotary switches, hereinafter identified, on a common shaft 37 driven from a motor 38.

The switching unit 36 includes a rotary switch 39 connected to the motor 38 by a control circuit 39a; a rotary switch 40 connected to the water entry, solenoid valve 29 by a control circuit 41; a rotary switch 42 connected to the soap entry, solenoid valve 35 by a control circuit 43; a rotary switch 44 connected to the circulation control, solenoid valve 30 by a control circuit 45; and a rotary switch 46 connected to the air entry, solenoid valve 34 by a control circuit 47.

The switching unit 36 has a common connection with the lead 11 of the main energizing circuit by means of a collector ring R.

The control circuits 39a, 41, 43, 45, and 47 include switch blades 48, 49, 50, 51, and 52, respectively, and said circuits, under the influence of the corresponding rotary switches, serve to energize the described solenoid valves. These solenoid valves are of a type which are normally closed, but open when the solenoid is energized.

The numeral 53 indicates a relay circuit connected in parallel to the motor control circuit 39a, so that when the latter is energized so is the relay circuit 53; the latter including a relay 54. The relay 54 is wired so that when it is energized it closes the circuit 10 for motor 9, to the end that the vacuum pump 8 may run at all times during operation of the motor 38, and which is necessary to the operation of the flushing apparatus.

When the apparatus is to be used, each claw unit 14 is placed upon the corresponding supporting device 23, and with all of the solenoid valves in their initially closed position the switching unit 36 is manually actuated to cause the motor control switch 39 to come into play, i. e. to maintain the motor 38 in operation for a predetermined length of time; it being understood that the shaft 37 is turned very slowly by said motor.

With each revolution of the motor control switch 39, the following cycle occurs under the Firstly, the rotary switch 40, as in Fig. 1, causes the water entry valve 29 to open for a limited period, whereupon the initially cold water from the tank 20 passes through the main flow pipe 22, and thence delivers, by means of the supporting device 23, into the teat cups 15 of the supported claw unit 14, effectively flushing these parts. From the claw unit 14 the water flows through the milking system, including milk hose 17, milk line 2, and milk receiving and discharge unit 3, also flushing these parts. The initial supply of flush water delivers into, and is retained in, the tank 6 of the unit 3.

It should be noted that the flushing apparatus, together with the milking system, is under the influence of vacuum, created by the pump 8, during the entire flushing cycle. This enhances or boosts the flow of water in its flushing course.

After the initial cold water flushing step, the switch 40 closes the valve 29, whereupon the switch 46 opens the air entry valve 34 for a limited period of time, and then said valve closes and the switch 40 opens the valve 29 for a further flushing step, this time with hot water which has fed into the tank 20 from pipe 21 to replace the previously withdrawn cold water.

During the time that the valve 29 is open to permit the hot water to enter the main flow pipe 22, the switch 42 opens the soap entry valve 35 so that liquid soap from tank 33 then feeds through pipe 32 into the main flow pipe 22.

The switches 40 and 42 close the valves 29 and 35 at substantially the same time, whereupon—after an air entry caused by switch 46 opening valve 34 for a limited time—the switch 44 opens the circulation control valve 30 so that the flush water may circulate from the tank 6, through return pipe 28, and into the main flow pipe 22 for continuous flow in a flushing circuit through the several parts of the flushing apparatus and the milking system. This is a relatively long period, and during this period of circulation of the flushing water the switch 46 acts intermittently to open valve 34 so that recurrent supplies of air are in effect injected into the flushing water in order to agitate and enhance the action thereof.

After the certain length of time predetermined for the circulation of the flushing water, the switch 44 causes the circulation control valve 30 to close, whereupon the flushing water all accumulates in the tank 6 and is drained by opening the valve 7.

The next step in the cycle of operations is opening of the air entry valve 34 by the switch 46 for a period of time adequate to permit the air to sweep all of the water out of the flushing apparatus and milking system into the tank 6.

After this step the switch 39 returns to its starting position, and at which position the motor control circuit 39a opens and the apparatus comes to rest.

With the above described flushing apparatus a continuous flow type milking system, together with the milk receiving and discharging unit 3, may be automatically flushed after milking operations at the dairy; the flushing operation being complete and effective, as is necessary to the maintenance of sanitary conditions.

From the foregoing description it will be readily seen that there has been produced such a device as substantially fulfills the objects of the invention, as set forth herein.

While this specification sets forth the present and preferred construction of the device, still in practice such deviations from such detail may be restorted to as do not form a departure from the spirit of the invention, as defined by the appended claims.

Having thus described the invention, the following is claimed as new and useful, and upon which Letters Patent are desired:

1. A flushing apparatus for a milking system having a receiving tank series and a teat-cup unit, said apparatus comprising a first pipe connected to the receiving tank series of the system and to a source of water under pressure, a pipe unit connected to the first pipe intermediate its ends and adapted for detachable connection with the claws of the teat-cup unit of the system, a container for cleansing solution connected to the pipe unit, a time-controlled mechanism operatively connected with the pipe and pipe unit, governing the flow of water and solution through the system in predetermined order and for a predetermined total time and to cause a suction pump connected to the receiving tank series to operate for such time, a second pipe connected to the pipe unit ahead of the container and open to atmosphere; said time-controlled mechanism comprising a valve in the first pipe ahead of the pipe unit, a valve controlling the flow from the container, a valve in the first pipe beyond the pipe unit, a valve in said second pipe, all said valves being initially closed; and electric time-controlled means operatively connected with the valves to open and close said valves in predetermined timed sequences for a predetermined total time.

2. A system as in claim 1, in which said time-controlled mechanism includes, with a circuit for the motor of the suction pump, a switch in the circuit closed for such predetermined total time.

3. A system as in claim 1, in which said time-controlled mechanism includes electric valve actuating devices, a rotary switch unit for said devices, an electric motor to turn the unit, a circuit for the motor, and a switch for the circuit included in the rotary unit and which is closed for such predetermined time of functioning of the system.

4. A flushing apparatus for a milking system having a receiving tank series and a number of teat cups, said apparatus comprising a pipe connected at one end to the receiving tank series of the system and at the other end to a source of water under pressure, a pipe arrangement connected to said pipe intermediate its ends and adapted for connection with the teat cups of the system in flow-through relation, a cleaning-solution tank connected to said pipe arrangement, means operatively connected with said pipe and pipe arrangement and including a timing mechanism to control the flow of water through the pipe and pipe arrangement in a predetermined direction and for predetermined periods in a cycle, and for introducing solution into the pipe from the cleaning-solution tank at a predetermined point and for a predetermined period of said cycle; said pipe arrangement including a pipe member, spaced horizontal pipe laterals on said member having upstanding nozzles on which the teat cups are removably engaged, and an upstanding clamping and supporting device on the pipe intermediate its ends for the body of the teat-cup unit.

5. A system as in claim 4, in which the nozzles on one lateral slope upwardly toward the nozzles on the other lateral and all said nozzles are tapered to wedgingly fit into the teat cups.

References Cited in the file of this patent

UNITED STATES PATENTS

| Number | Name | Date |
|---|---|---|
| 1,393,387 | McCornack | Oct. 11, 1921 |
| 1,613,185 | Mitchell | Jan. 4, 1927 |
| 1,787,152 | Hapgood | Dec. 30, 1930 |
| 1,803,319 | Beckman | May 5, 1931 |
| 1,987,955 | Hapgood | Jan. 15, 1935 |
| 2,199,821 | Hapgood | May 7, 1940 |
| 2,215,018 | Schmitt | Sept. 17, 1940 |
| 2,434,353 | Edwards | Jan. 13, 1948 |
| 2,477,415 | Oliver | July 26, 1949 |
| 2,558,628 | Redin | June 26, 1951 |
| 2,583,723 | Berry | Jan. 29, 1952 |
| 2,624,355 | Buchinger | Jan. 6, 1953 |